United States Patent

[11] 3,622,870

| [72] | Inventors | Allen R. Hamilton;<br>Thomas R. Metzger, both of Rochester, N.Y. |
|---|---|---|
| [21] | Appl. No. | 819,072 |
| [22] | Filed | Apr. 24, 1969 |
| [45] | Patented | Nov. 23, 1971 |
| [73] | Assignee | The Bendix Corporation |

[54] PENNING GAUGE CIRCUIT IMPROVEMENT
1 Claim, 3 Drawing Figs.

| [52] | U.S. Cl. | 324/33 |
|---|---|---|
| [51] | Int. Cl. | G01n 27/00 |
| [50] | Field of Search | 324/33, 132; 307/317, 263 |

[56] References Cited
UNITED STATES PATENTS

| 2,806,154 | 9/1957 | Steinbuch | 307/263 |
|---|---|---|---|
| 3,379,967 | 4/1968 | Herrwerth | 324/33 |

*Primary Examiner*—Michael J. Lynch
*Attorneys*—Plante, Hartz, Smith & Thompson and Raymond J. Eifler ABSTRACT: An improved Penning gauge circuit in which the sensitivity and linearity of the response is maintained at pressures in the $10^{-4}$ and $10^{-5}$ torr range by using a device having nonlinear resistance in series with the sensing head.

PATENTED NOV 23 1971　　3,622,870

ALLEN R. HAMILTON
THOMAS R. METZGER
INVENTORS

BY

PENNING GAUGE CIRCUIT IMPROVEMENT

BACKGROUND OF INVENTION

When measuring pressures over a broad range, e.g. $10^{-1}$ torr to $10^{-10}$ torr in an enclosure that is being evacuated, different gauges are used in combination to obtain accurate measurements. A gauge that measures pressures accurately down to the $10^{-3}$ torr range will be used in combination with a gauge that measures pressure accurately from the $10^{-4}$ torr range to lower pressures. In this way, as the pressure drops below the measurement capabilites of one gauge, it is measured by another. Matching the gauges to accomplish this object has always been a problem because of the measurement capabilites of the gauges. For example, a Penning vacuum gauge which exhibits linear behavior for pressures below $10^{-5}$ torr, exhibits nonlinear behavior, in the $10^{-5}$ and $10^{-4}$ torr ranges. This limits the usefulness of that gauge in that it leaves a gap between the lowest pressure reading of a thermal conductivity vacuum gauge (Pirani Gauge, thermocouple, etc.), which measures pressures down to $10^{-3}$ torr, and the highest linear pressure reading of the Penning gauge. The nonlinearity of the Penning gauge at pressures above $10^{-5}$ torr results from the fact that at those pressures, the current through the sensing head is a function of both the pressure within the head and the current limiting resistance in series with the sensing head. Presently, known vacuum gauges have attempted to solve this problem by varying the circuit voltage or varying (in steps) the current limiting resistor in series with the sensing head. Neither of these methods is satisfactory because changing circuit constants (e.g. voltage and/or resistance) adversely affects the equilibrium of the pressure-current relationship of the gauge.

SUMMARY OF THE INVENTION

It is our invention to make use of a device having nonlinear resistance characteristics in combination with a Penning vacuum gauge circuit to obtain a substantially linear response from the gauge circuit when the sensing head is subjected to pressures in the $10^{-4}$ and $10^{-5}$ torr ranges. By proper selection of the nonlinear device, based upon its voltage-resistance characteristics, it is possible to obtain from the gauge circuit a substantially linear response between pressure and sensing head current at pressures in the $10^{-4}$ and $10^{-5}$ torr ranges.

It is, therefore, an object of this invention to provide an improved arrangement for a Penning vacuum gauge circuit that will have a substantially linear output as the pressure being measured in the sensing head drops below $10^{-3}$ torr.

It is another object of this invention to provide a vacuum gauge circuit with a nonlinear element which is chosen to compensate for the nonliner response from a pressure sensing head at particular pressures so as to extend the linear operating range of the gauge circuit.

DESCRIPTION OF THE PREFERRED EMBODIMENT

Figure 1:
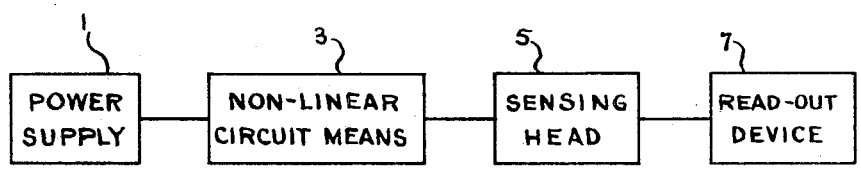
FIG. 1 is a block diagram of a preferred vacuum gauge circuit arrangement.

Referring now to drawing and more particularly, FIG. 1, which shows a block diagram of a preferred vacuum gauge circuit for accomplishing the object of our invention. The power supply 1 for the circuit is connected to the sensing head 5 through the nonlinear circuit means 3. The nonlinear circuit means may be either a solid-state device or an electron tube. The readout device 7 connected to the sensing head 5, comprises means to amplify and/or translate the signal from the sensing head into units of electrical current or units of pressure.

Figure 2:
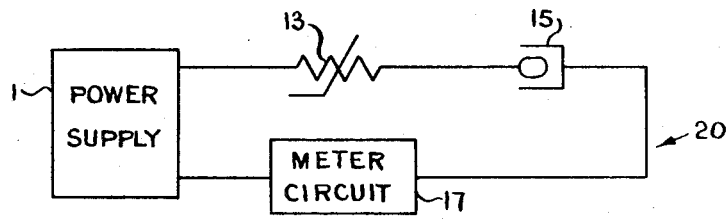
FIG. 2 is a preferred arrangement of a gauge circuit showing a varistor in series with a Penning Discharge Vacuum gauge.

Referring now to FIG. 2 which shows a partial schematic of a preferred embodiment of our invention. The power supply 1 for the circuit may be any standard high voltage (1–5kv) DC power supply capable of supplying a current of at least 3 milliamperes. The high voltage lead (+) from the power supply 1 is connected in series to a varistor 13 which in turn is connected in series to the anode of a Penning Vacuum Gauge head 15 (Type GPD–001). The varistor 13 which also serves as a current limiting resistor, which is preferred for use with a type GPD–101 sensing head, is manufactured by Carborundum Company and is a type BNR, rated at 2 milliamperes at 840 volts, and 0.09 milliamperes at 300 volts. Although varistor 13, type BNR is preferred, other types of varistors, individually or in combination with fixed resistors, may be used depending upon the results desired. The meter circuit 17 which is connected to the cathode of the gauge 15 comprises a current sensing readout device which may be an ammeter calibrated in units of electrical current or units of pressure. Where desirable, range switching components and/or an amplifier may be used in conjunction with the meter. The ammeter which is preferred in combination with a type GPD–101 gauge head 15 has a range of 0 to 200 microamperes.

Figure 3:
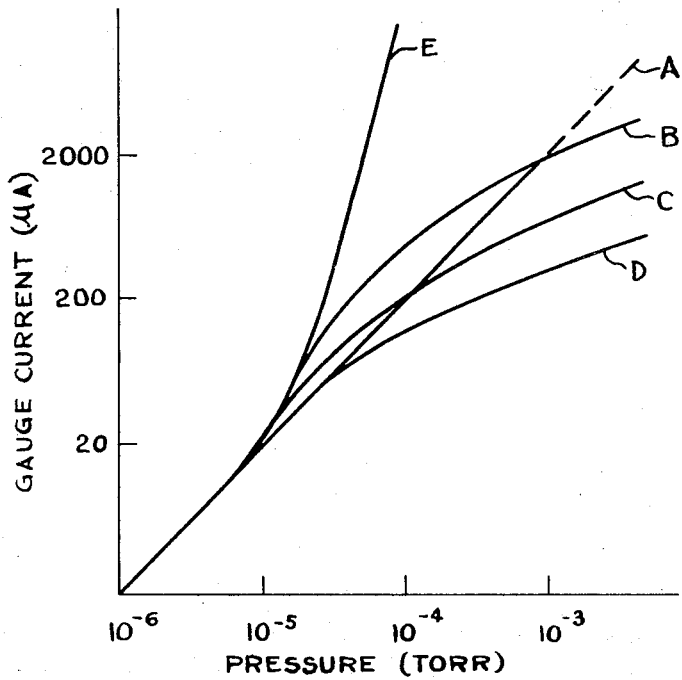
FIG. 3 is a graphic representation of the pressure-current characteristics of a Penning Gauge Type GPD 101 for different resistances in a series with the sensing head.

FIG. 3 is a graphic representation of the pressure-current characteristics for our invention as compared with previous Penning Discharge Gauge circuits having fixed resistance valves. Curve A is the characteristic curve for the circuit shown in FIG. 2 with a varistor in the circuit. Ideally, the varistor changes its resistance so that the current through the sensing head 15 remains a linear function of pressure for the circuit in the $10^{-4}$ and $10^{-5}$ torr ranges. The varistor, therefore, is chosen for the circuit by its electrical characteristics which will result in the circuit having a substantially linear response as compared to a circuit having a fixed resistance value which does not have a linear response to pressures above $10^{-5}$ torr.

Curves B, C and D indicate the current response of the circuit shown in FIG. 2 to changes in pressure when a fixed resistance value of 1, 2 and 3 million ohms respectively is substituted for varistor 13. Curve E is the characteristic curve of the circuit when varistor 13 is removed from the circuit and no resistor is placed between the power supply 1 and the sensing head 15.

OPERATION

Referring now to FIGS. 1 and 2, the circuit operates as follows. When the circuit is energized, a potential is applied to the sensing head 5, 15. As the enclosure (not shown) to which the sensing head 5, 15 is attached is evacuated, the current flowing through the gauge sensing head 5, 15 decreases. However, with constant potential applied to the sensing head, the current would decrease more rapidly than the pressure, through the $10^{-4}$ and $10^{-5}$ torr pressure ranges. It is in these pressure ranges that the nonlinear circuit device of the invention serves its purpose, since as the current decreases, the resistance of the nonlinear device increases in the correct amount so as to maintain a linear relationship between pressure and current. For pressures below $10^{-5}$ torr, the resistance of the sensing head is so large in proportion to the resistance of the varistor 13 that changes in the resistance of the varistor have little or no effect on the circuit current. But for pressure above $10^{-5}$ torr, the varistor is chosen to have a resistance large enough to affect the circuit current. This provides the person monitoring the pressure in the evacuated enclosure (not shown) with linear response in the $10^{-4}$ and $10^{-5}$ torr range. In actual practice, we have been able to extend the linear relationship (current vs. pressure) to about $8 \times 10^{-4}$ torr range for a Penning Discharge Vacuum gauge. With other voltages, magnetic field strengths, and sensing head geometry, it is possible to extend the linear range to $10^{-3}$ torr and higher.

While we have disclosed a preferred embodiment of our invention, it will be apparent that variations in the specific details of construction which have been illustrated and

We claim:

1. A vacuum gauge comprising:
   a Penning type vacuum gauge head of the type having an envelope adapted for connection to a vacuum system, an anode, and a cold cathode electrode enclosed by said envelope,
   a voltage source connected across the electrodes of said gauge head;
   a current measuring means connected to measure the ionization current produced in said gauge head; and
   a varistor connected in series with said gauge head, said varistor having electrical characteristics such that when said envelope is evacuated a substantially linear relationship between pressure and current in said envelope is obtained in the $10^{-4}$ and $10^{-5}$ torr range.

* * * * *

UNITED STATES PATENT OFFICE
CERTIFICATE OF CORRECTION

Patent No. 3,622,870　　　　　　　　　Dated　November 23, 1971

Inventor(s) Allen R. Hamilton, et al

It is certified that error appears in the above-identified patent and that said Letters Patent are hereby corrected as shown below:

Column 1, line 5, "10'7E'1" should read -- $10^{-1}$ --;

line 6, "10'7E'10" should read -- $10^{-10}$ --;

line 9, "10'7E'3" should read -- $10^{-3}$ -- ;

line 10, "10'7E'4" should read -- $10^{-4}$ --;

line 17, "10'7E'5", both occurrences, should read -- $10^{-5}$ --;

line 18, "10'7E'4" should read -- $10^{-4}$ --;

line 21, "10'7E'3" should read -- $10^{-3}$ --;

line 24, "10'7E'5" should read -- $10^{-5}$ --;

line 40, "10'7E'4" should read -- $10^{-4}$ -- , and "10'7E'5" should read -- $10^{-5}$ --;

line 44, "10'7E'4" should read -- $10^{-4}$ -- , and "10'7E'5" should read -- $10^{-5}$ --;

line 48, "10'7E'3" should read -- $10^{-3}$ -- .

Column 2, line 31, "10'7E'4" should read -- $10^{-4}$ -- , and "10'7E'5" should read -- $10^{-5}$ -- ;

UNITED STATES PATENT OFFICE
CERTIFICATE OF CORRECTION

Patent No. 3,622,870      Dated November 23, 1971

Inventor(s) Allen R. Hamilton, et al      -2-

It is certified that error appears in the above-identified patent and that said Letters Patent are hereby corrected as shown below:

Column 2, line 36, "10'7E'5" should read -- $10^{-5}$ -- ;

line 54, "10'7E'4" should read -- $10^{-4}$ -- , and "10'7E'5" should read -- $10^{-5}$ -- ;

line 59, "10'7E'5" should read -- $10^{-5}$ -- ;

line 63, "10'7E'5" should read -- $10^{-5}$ -- ;

line 66, "10'7E'4" should read -- $10^{-4}$ -- ;

line 67, "10'7E'5" should read -- $10^{-5}$ -- ;

line 69, "8X10'7E'4" should read -- $8 \times 10^{-4}$ -- ;

line 72, "10'7E'3" should read -- $10^{-3}$ -- . Column 4, line 8, "10-7E'4" should read -- $10^{-4}$ -- , and "10-7E'5" should read -- $10^{-5}$ -- .

Signed and sealed this 31st day of October 1972.

(SEAL)
Attest:

EDWARD M. FLETCHER, JR.
Attesting Officer

ROBERT GOTTSCHALK
Commissioner of Patents